United States Patent [19]
Borchert et al.

[11] Patent Number: 5,448,830
[45] Date of Patent: Sep. 12, 1995

[54] PROCESS FOR THE PRODUCTIOIN OF A HEAT EXCHANGER AND APPARATUS FOR CARRYING OUT THE METHOD

[75] Inventors: Werner Borchert, Mülheim-Ruhr; Hans-Henning von Cleve, Bochum, both of Germany

[73] Assignee: GEA Luftkühler GmbH, Sevelen, Switzerland

[21] Appl. No.: 910,289

[22] PCT Filed: Nov. 30, 1991

[86] PCT No.: PCT/DE91/00937
  § 371 Date: Jul. 14, 1992
  § 102(e) Date: Jul. 14, 1992

[87] PCT Pub. No.: WO92/10329
  PCT Pub. Date: Jun. 25, 1992

[30] Foreign Application Priority Data
  Dec. 8, 1990 [DE] Germany .................. 40 39 292.9

[51] Int. Cl.6 .................................... B23D 15/26
[52] U.S. Cl. ..................... 29/890.046; 29/463; 29/464; 29/890.053
[58] Field of Search ................. 29/890.046, 890.053, 29/463, 464; 228/183

[56] References Cited

U.S. PATENT DOCUMENTS

| | | | |
|---|---|---|---|
| 2,291,985 | 8/1942 | Powers | 29/890.046 |
| 2,716,276 | 8/1955 | Brown, Jr. | 29/890.046 |
| 2,731,245 | 1/1956 | McChesney | 29/890.046 |
| 3,002,729 | 10/1961 | Welsh | 29/890.046 |
| 3,007,237 | 11/1961 | Woodruff | 29/890.046 |
| 3,189,087 | 6/1965 | Parris | 29/890.046 |
| 3,521,707 | 7/1970 | Brown | 29/890.046 |
| 3,578,165 | 5/1971 | Boose | 29/890.046 |
| 4,171,015 | 10/1979 | Bucey et al. | 29/890.046 |
| 4,815,651 | 3/1989 | Malwitz | 29/890.046 |
| 4,856,165 | 8/1989 | Reuchlein et al. | 29/890.046 |

*Primary Examiner*—Irene Cuda
*Attorney, Agent, or Firm*—Friedrich Kueffner

[57] ABSTRACT

A supporting belt (3) for ribs (7), carrier belts (6) for the ribs (7) arranged adjacent to the supporting belt (3), a feed (8) for the ribs (7), and a fusion welding device (11) (laser beams, electron beams) which welds half-tubes (10) with the ribs (7) contacting the outer sides of the latter (10) proceeding from the inner sides are used to provide tubes with ribs. After providing the half-tubes (10) with ribs, the latter are connected with additional ribbed half-tubes (10) by means of welding the longitudinal edges (27) to form exchanger tubes. These exchanger tubes can then be galvanized individually or in bundles as heat exchangers.

10 Claims, 7 Drawing Sheets

PROCESS FOR THE PRODUCTIOIN OF A HEAT EXCHANGER AND APPARATUS FOR CARRYING OUT THE METHOD

BACKGROUND OF THE INVENTION

1. Field of the Invention

The invention is directed to a process for producing a heat exchanger whose extension in flow direction of an outer heat exchanger medium is dimensioned so as to be substantially greater than the height thereof, wherein separately manufactured ribs are connected to the exchanger tubes in a continuous manner and the ribbed exchanger tubes are subsequently galvanized. The invention is also directed to an apparatus for implementing the process.

2. Description of the Related Art

A heat exchanger is known from DE-PS 34 19 734 by means of which heat can be exchanged e.g. between gases and liquids or between gases and condensing vapors. Such a heat exchanger is used predominantly to cool air or to condense vapors by means of air.

Steel ribs in particular, specifically dip-galvanized steel ribs, are used in connection with steel exchanger tubes. Such ribs are punched from plates or strips on corresponding machines and are slid onto the exchanger tubes in the longitudinal direction. The subsequent galvanization in the immersion bath serves not only to protect the exchanger tubes and the ribs, but also simultaneously produces the metallic connection of the exchanger tubes with the ribs.

The exchanger tubes, which are slender in the direction of flow of the external heat exchanger medium and oval in principle, are arranged so as to be adjacent to one another in at least one row between tube bases at the ends. The tube ends are rolled or welded in the tube bases. Stable supporting constructions are made use of in addition to the tube bases for connecting the exchanger tubes.

When manufacturing the known heat exchanger it is necessary that the mechanical processes for punching out and sliding the ribs on the exchanger tubes be effected with great precision so as to ensure the most intimate possible connection of the exchanger tubes with the ribs. A considerable expenditure is required for this. Further, since the ribs are slid over the exchanger tubes, the punched out material in the cross section of the exchanger tubes makes up a considerable proportion in terms of weight and is mostly scrapped without being utilized.

If the exchanger tubes are galvanized individually, every exchanger tube is first pressed flat at its ends and tightly welded so that only the outer surfaces are pickled and passivated and a galvanizing of the inner surfaces is prevented. This also requires a considerable expenditure. After galvanizing the exchanger tubes the flattened and welded ends must be removed. This likewise involves additional work time and material waste which is not recoverable in principle.

It is then necessary to join the individual exchanger tubes via the aforementioned supporting constructions to form heat exchangers which must be self-supporting along their length.

Thus, in the known case, the production of a heat exchanger involves relatively costly and time-consuming work steps. In addition, the manufacturing sequences are made more difficult by steps for preventing damage to the surface protection afforded by the galvanizing during the assembly of the heat exchanger.

As a result of internal vacuum pressure and/or external excess or over-pressure, substantial forces act on the large surface area flanks of the slender exchanger tubes. As a result, the tube flanks are pressed in when a determined degree of slenderness is exceeded if suitable measures in the form of supports are not provided. In this regard it has been suggested to support the tube flanks relative to one another by at least one inner transverse web.

SUMMARY OF THE INVENTION

The present invention is based on the problem of providing a process for the production of a heat exchanger, as well as an apparatus for carrying out the process, which allows the production of heat exchangers with exchanger tubes which are slender and extend lengthwise in the flow direction of the external heat exchanger medium and in which the risk of the large surface area tube flanks being pressed in can be avoided with economically practicable steps.

In accordance with the present invention, the rib feet of the ribs are placed onto the outer surface of a half-tube in a quantity and with defined parallel spacing between the rib webs corresponding to the length of the exchanger tube. The ribs and the half-tube are displaced at identical speeds in longitudinal direction of the half-tube. A fusion welding beam is directed against the inner surface of the half-tube, wherein the fusion welding beam is guided in a direction extending inclined relative to the flow direction of the half-tube in a reciprocating manner over the entire width of the half-tube for connecting the rib feet to the outer surface of the half-tube. The fusion welding beam may be a laser beam or an electron beam. Subsequently, two ribbed half-tubes are welded together at longitudinal edges thereof to form an exchanger tube. Finally, the exchanger tube is subjected to a galvanizing process.

According to this suggestion, the tube flanks are now stiffened in an unobjectionable manner prior to the galvanization of the exchanger tubes by means of a fixed connection with the ribs. The laser beam welding process in particular, or a process having the relevant characteristics of this process, is made use of for this purpose. In order to realize the welding process in an unobjectionable manner, the invention first provides that the short rib feet achieve an extensively surface-area contact with an outer side of a half-tube. While the rib feet remain in contact at the outer side, a fusion welding beam is guided transversely along the inside of the half-tube in such a way that every rib foot is securely connected with the half-tube at a plurality of locations due to the relative movement of the half-tube and ribs on the one hand and the fusion welding beam on the other hand.

The outside (tube flank) of a half-tube thus undergoes a multifold stiffening via the ribs. As a result, even extremely slender exchanger tubes are effectively stiffened and can nevertheless be manufactured economically. Moreover, the process allows a rapid and relatively inexpensive conversion to optimal cross sections according to thermodynamic calculations to be made on an individual basis. It should be mentioned in this regard that because of the large number of ribs to be inserted conventional fastening measures very quickly reach the limits of economical feasibility (a typical large tube bundle with approximately fifty ribbed tubes having a length of 10 m has approximately 8000 ribs per ribbed tube).

When all ribs of a half-tube have passed through the area of influence of the fusion welding beam, such a ribbed half-tube is joined to another half-tube provided with ribs in this manner and is welded along the longitudinal edges to form an exchanger tube.

The ribs can be manufactured individually and fed one after the other to the ribbed half-tube. But it is also conceivable for the ribs to form a component part of a meander-shaped strip which is welded on a half-tube.

Such an exchanger tube can be subjected to a galvanizing process individually or in a bundle with other exchanger tubes. This can be effected e.g. in that the exchanger tubes are blind-flanged at one end and then pickled and passivated. The exchanger tubes are then galvanized in a bath individually or in bundles.

In accordance with another process according to the present invention, instead of directly welding two ribbed half-tubes together at the longitudinal edges thereof, the ribbed half tube is rotated by 180° and the free rib feet of the ribs are placed on the outer surface of another half-tube. The ribbed half-tube and the other half-tube are displaced together at identical speeds in longitudinal direction. Another fusion welding beam is directed against the inner surface of the other half-tube, wherein the fusion welding beam is guided in a direction extending inclined relative to the longitudinal direction of the half-tubes in a reciprocating manner over the entire width of the other half-tube for connecting the free rib feet to the outer surface of the other half-tube. Subsequently, the half-tube and the other half-tube connected to each other by the ribs are welded at the longitudinal edges thereof to additional half-tubes to form exchanger tubes. Finally, the exchanger tubes are subjected to a galvanizing process.

This process provides that two half-tubes be coupled with one another by means of U-shaped ribs by applying the fusion welding beam process and that such a composite element then be connected with other such composite elements by welding along the longitudinal edges of the half-tubes to form a row-like tube bundle.

In this case also, as in the embodiment form described in the preceding, ribs—in this case U-shaped ribs—are first welded on an outer side of a half-tube in that a fusion welding beam is guided transversely along the inside of the half-tube while the rib feet remain in contact at the outer side in such a way that every rib foot is securely connected with the half-tube at a plurality of locations due to the relative movement of the half-tube and ribs on the one hand and the fusion welding beam on the other hand. The half-tube which is provided with ribs in this way is then connected with the next half-tube in that the latter half-tube is placed on the free rib feet of the ribs and then welded with the latter via the fusion welding beam.

The exchanger tube rows formed in this way have the advantage that the sensitive ribs are protected during the various handling steps when galvanizing and are consequently not exposed to any damage.

A further advantage consists in that only one rib row is arranged between two adjacent exchanger tubes. This further adds to the economy of production.

It is also conceivable within the framework of the process discussed above to weld the U-shaped ribs at the adjacent half-tubes simultaneously. For this purpose, it is necessary to advance the fusion welding beams to the inner sides of the half-tubes from both directions to connect the ribs with the two half-tubes.

In this case also, the ribs can be manufactured individually or can form a component part of a meander-shaped strip.

Although in the preceding description half-tubes of a defined length are connected with a number of ribs deposited thereon, it is not remote from the basic idea according to the invention also to provide half-tubes of indefinite length with ribs and to shorten these ribbed half-tubes subsequently corresponding to the respective requirements. A significant economical advantage is likewise achieved in this way.

In accordance with another feature of the present invention, spacers which are dimensioned so as to be longer than the rib feet are punched out of the rib webs and are bent parallel to the rib feet. Accordingly, the spacers can be dimensioned in such a way that they not only support the rib webs relative to one another in a faultless manner and accordingly prevent a twisting of the slender rib webs when the tube flanks are loaded, but also create free spaces in the region of the rib feet. Consequently, transitions are formed in the manner of concave fillet welds between the tube wall and the rib feet during galvanization, which leads to a noticeable improvement in the heat flow.

The spacers preferably have a trapezoidal configuration. They are uniformly or irregularly distributed along the length as well as along the height of the rib webs. Other configurations are also conceivable, since they also produce turbulence at the rib surface and accordingly contribute to improving the heat transfer.

In accordance with another feature, the ribs are fastened at an angle diverging from 90° relative to the longitudinal extension of the exchanger tubes. This helps to minimize the secondary losses of a heat exchanger on the coolant side. In this case, the ribs act to a certain extent as guide vanes for the outer heat exchanger medium.

The apparatus for implementing the above-described process includes a supporting belt traveling around horizontal axes in a continuous manner and having a horizontal transporting surface. Carrier belts travel around vertical axes in a continuous manner at the sides of the supporting belt synchronously with the latter. A feed for the ribs is arranged at one end of the supporting belt and is connected with at least one carrier belt through a coupling. A slide-in unit for half-tubes extends behind the feed in the travel direction of the supporting belt. A device for fusion welding beams, i.e., laser beams, electron beams, etc. is located at the other end of the supporting belt and produces a fusion welding beam which is guided in a reciprocating manner diagonally relative to the travel direction of the supporting belt.

In a preferred construction this concerns an apparatus which does not, in principle, have its own drive unit. That is, neither the supporting belt nor the carrier belts or feed for the ribs have their own motor drives. A tractive force is simply applied to the half-tubes to be outfitted with ribs. This tractive force then acts on the lateral carrier belts for the ribs via the ribs which have already been welded with a half-tube and finally also on the feed cycle via the coupling between at least one carrier belt and the rib feed. In this way, it can be ensured that all moving parts run in an unequivocally synchronous manner and an exact positioning of the ribs at the half-tubes can accordingly be ensured. The invention meanwhile does not exclude the possibility of outfitting at least one part with a drive.

The invention provides a rib feed at one end of the supporting belt extending in a continuous manner around horizontal axes. The ribs come e.g. from a punch or from a vibrating cup. They are deposited in working cycles on the transporting surface of the supporting belt in the region of the feed and subsequently arrive within the area of influence of the lateral carrier belts. The latter serve not only for the forward movement of the ribs, but also exactly determine the spacing of the ribs and their vertical position. The rib feed normally extends at a right angle relative to the running direction of the supporting belt.

A slide-in unit for half-tubes is provided behind the feed in the running direction of the supporting belt. This slide-in unit brings the outer sides of the half-tubes into contact with the rib feet lying at the top and advisably couples them with a half-tube so as to be fixed with respect to tensile and compressive forces, the half-tube having already been subject to a certain tractive force beforehand. In this way, the ribs which are only in contact with a half-tube move at the same speed as the respective half-tube.

The rib feet and the half-tubes are connected proceeding from their inner sides by means of a fusion welding beam in the region of the welding device. Since the fusion welding beam is compulsorily guided in a reciprocating manner diagonally relative to the running direction of the supporting belt, there is a certain zig-zag-shape to the weld seam—as seen along the length of a half-tube —which ensures that every rib foot is connected with the half-tube a number of times by a diagonally extending weld seam. Another advantage of fusion beam welding consists in that the fusion welding beam can be applied from the inside of the half-tubes when arranging the ribs on half-tubes. The protective gas shielding required for welding can be built up from this side substantially easier than if it had to be produced on the other side in the region of the rib feet.

According to another feature, the sequence of movements of the supporting belt, carrier belts, slide-in unit, feed and welding device are adjusted in dependence on the forward feed speed of the half-tubes subjected to tractive force. Consequently, the movement of all these structural component parts is based only on this tractive force exerted on the half-tubes. Accordingly, an absolutely synchronous manufacturing sequence can be ensured in the simplest manner and without the use of individual drive devices. However, one of the parts can also be driven due to the synchronous interplay.

The feed includes a vertical rib shaft, at least one detaching or isolating pinion and a compressed air-operated contact pressure unit. At least one detaching or isolating pinion is arranged at the lower end of the vertical rib shaft. This isolating pinion ensures that the ribs are deposited accurately and gently on the transporting surface of the supporting belt with the rib feet at the top and are then immediately pressed against the ribs which have already been deposited on the supporting belt beforehand by means of the compressed air of the contact pressure unit acting in the longitudinal direction of the supporting belt. The isolating pinion is coupled with at least one carrier belt in such a way that by actuating the coupling in a corresponding manner it can easily be ensured e.g. that the ends of the half-tubes have no ribs so that the exchanger tubes which are formed after welding two half-tubes can be fixed in the tube bases in an orderly manner.

The slide-in unit may include conveying means which act transversely relative to the running direction of the supporting belt and which can be constructed as desired. For example, a transverse conveyor belt which slides the half-tubes on the ribs which are positively guided by the carrier belts is conceivable. But conveying means which place the half-tubes on the ribs from above is also conceivable.

In order to ensure the small gap between the rib feet and the outer sides of the half-tubes which is required in fusion beam welding, ball contact pressure strips are provided at both sides of the running plane of the fusion welding beam. That is, every half-tube is pressed against the ribs deposited on the supporting belt immediately in the region of the fusion welding beam with the required contact pressure by means of the ball contact pressure strips.

In this respect, an advisable abutment for the ball contact pressure strips is provided when the welding device includes a roller contact pressure bed arranged below the supporting bed. Such a roller contact pressure bed advisably extends along the entire sphere of influence of the fusion welding beam.

The various features of novelty which characterize the invention are pointed out with particularity in the claims annexed to and forming a part of the disclosure. For a better understanding of the invention, its operating advantages, specific objects attained by its use, reference should be had to the drawing and descriptive manner in which there are illustrated and described preferred embodiments of the invention.

DESCRIPTION OF THE PREFERRED EMBODIMENTS

Figure 1:
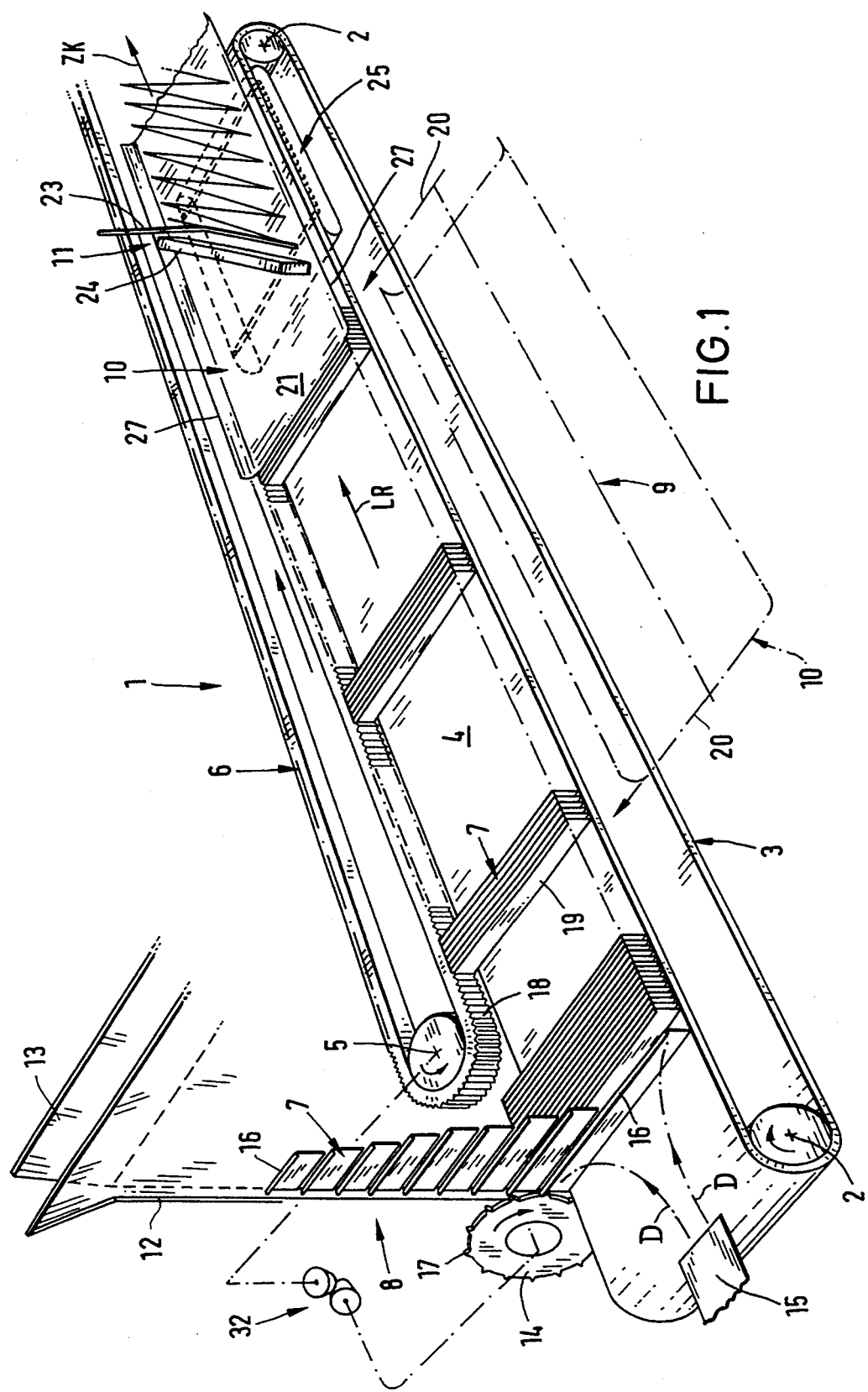
FIG. 1 is a perspective schematic view of an apparatus for producing ribbed half-ribs as intermediate products for exchanger tubes.
Figure 2:
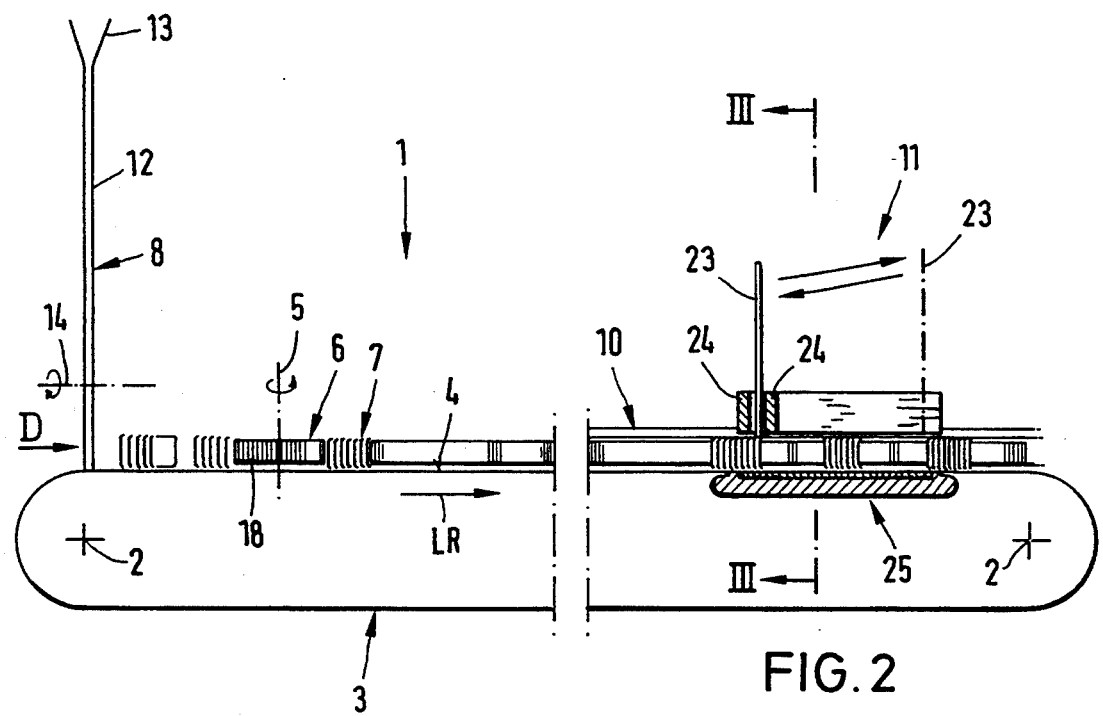
FIG. 2 shows a longitudinal section through the view according to FIG. 1.
Figure 3:
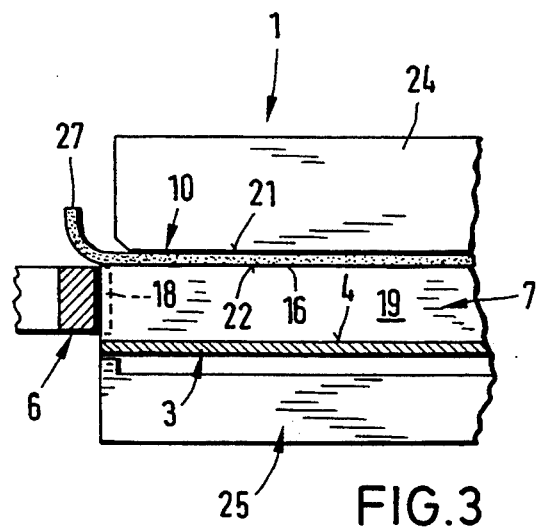
FIG. 3 is a cross section through the view of FIG. 2 along line III—III.

An apparatus for producing ribbed half-tubes 10 is designated by 1 in FIGS. 1 to 3. The apparatus 1 comprises a supporting belt 3 extending in a continuous manner around horizontal axes 2 and having a horizontal transporting surface 4, carrier belts 6 for ribs 7 (only one carrier belt 6 is shown), which carrier belts 6 extend around vertical axes 5 in a continuous manner at both sides of the supporting belt 3 so as to be synchronous with the latter, a feed 8 for the ribs 7 arranged at one end of the supporting belt 3, a slide-in unit 9 for half-tubes 10 not provided with ribs, which slide-in unit 9 extends behind the feed 8 in the running direction LR of the supporting belt 3, and a laser welding device 11 located at the other end of the supporting belt 3. The feed 8 which extends at a right angle relative to the running direction LR of the supporting belt 3 is arranged parallel to the horizontal axes 2 of the supporting belt 3.

The feed 8 for the ribs 7 comprises a vertical rib shaft 12 with a feed hopper 13, two isolating pinions 14 (only one of which is shown) arranged at the lower end of the rib shaft 12 at both sides of the supporting belt 3, and a contact pressure unit 15 which can be acted upon by compressed air D. The ribs 7 (see also FIGS. 4 and 6) which are L-shaped in cross section and come from a corresponding punch fall into the rib shaft 12 with the rib feet 16 at the top and are deposited on the transporting surface 4 of the supporting belt 3 in a given work cycle by the isolating pinions 14 which are provided with guide cams 17 at their circumference. After the guidance between the isolating pinions 14 and the ribs 7 is canceled, the ribs 7 are blown against the ribs 7 already located on the supporting belt 3 by means of the compressed air D exiting from the contact pressure unit 15.

The carrier belts 6 which are arranged at the two sides of the supporting belt 3 in the vertical range of the ribs 7 and provided with lateral cut out portions 18 extend at a distance from the feed 8. The cut out portions 18 are constructed in such a way that they grasp the rib web 19 extensively without play.

Figure 9:
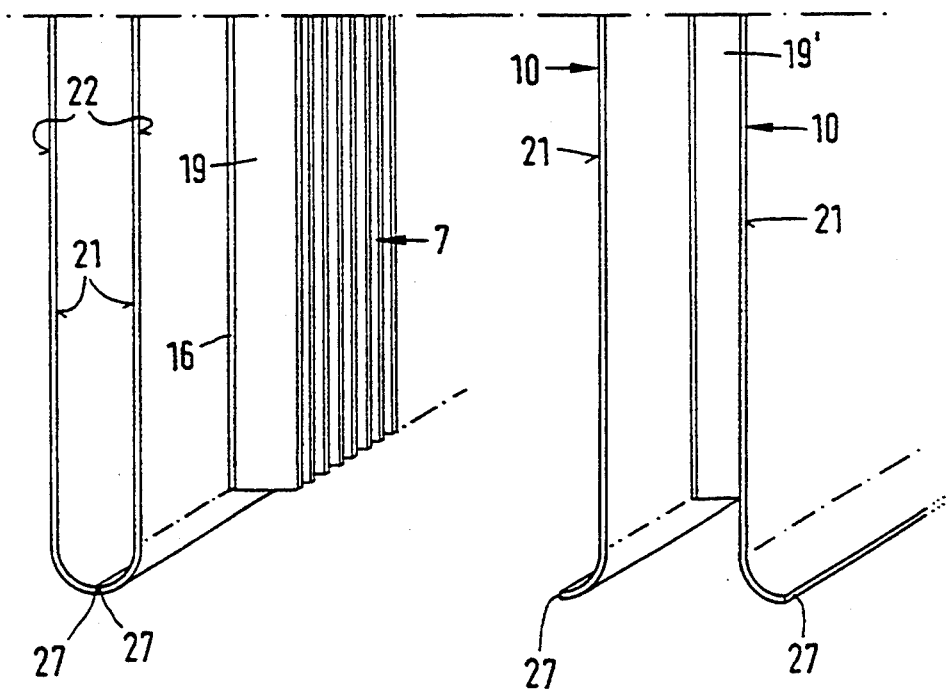
FIG. 9 is a perspective schematic view of a composite element comprising two half-tubes connected with one another by ribs.

Further, the slide-in unit 9 for the half-tubes 10, which can be seen in more detail particularly from FIG. 9, is shown at a distance from the feed 8 in the running direction LR of the supporting belt 3. This slide-in unit 9, which is only indicated schematically, makes it possible, through the use of suitable conveyor means 20, to move the half-tubes 10 with their inner sides 21 on top over the ribs 7, which are centered by the carrier belts 6, in such a way that the outer sides 22 of the half-tubes 10 achieve surface contact with the rib feet 16.

The laser welding device 11 is provided adjacent to the slide-in unit 9 in the running direction LR of the supporting belt 3. The laser welding device 11 has a laser beam 23 which is inclined vertically relative to the running direction LR of the supporting belt 3 and is positively guided in reciprocating motion along the entire width of the half-tube 10. Ball contact pressure strips 24 (only one is shown in FIG. 1) are provided at both sides of the laser beam 23 and ensure that the half-tube 10 located in the effective area of the laser beam 23 is pressed against the rib feet 26 with its outer side 22 in this area in a faultless manner.

A roller contact pressure bed 25 is provided below the supporting belt 3 as an abutment for the ball contact pressure strips 24.

The motive power for the supporting belt 3, the carrier belts 6 and the feed 8 is applied via a tractive force ZK which acts on the half-tube 10 located within the laser welding device 11. The subsequent half-tubes 10 introduced via the slide-in unit 9 are advisably coupled with the half-tubes 10 located in the laser welding device 11 so as to be mechanically detachable.

The course of the laser beam 23, the speed of the reciprocating laser beam 23 and the forward feed speed of the half-tube 10 located in the laser welding device 11 are adapted to one another in such a way (see also FIGS. 4 and 5) that every rib foot 16 is connected with the half-tube 10 multiple times in a line-shaped manner. The weld seam is designated by 26.

Figure 8:
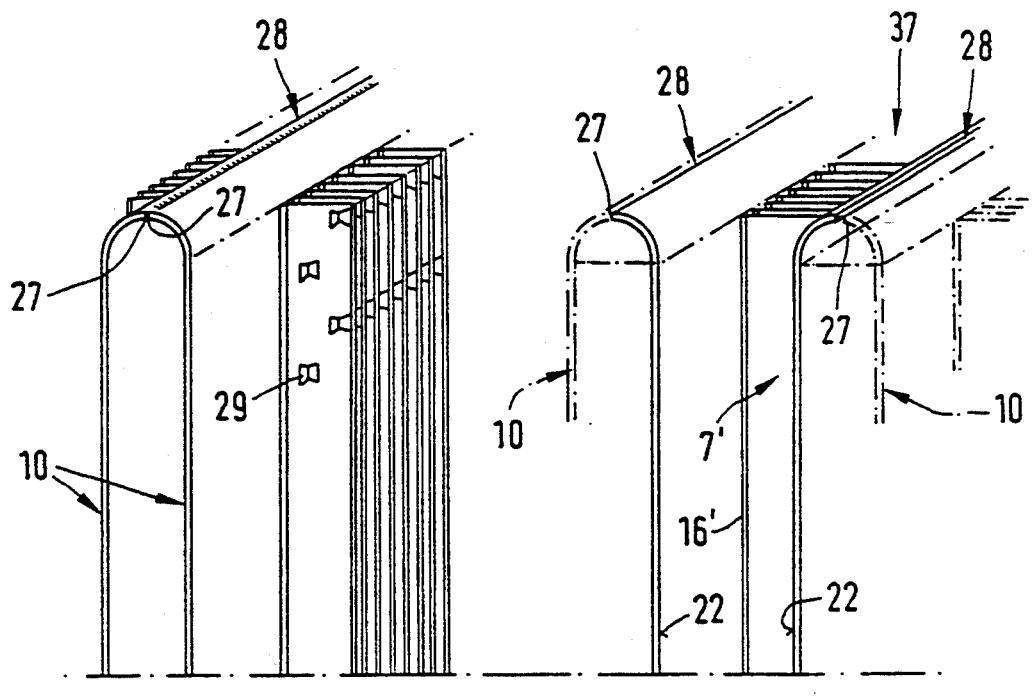
FIG. 8 is a perspective schematic view of a portion of an exchanger tube wit ribs attached at both sides.

When a half-tube 10 has been fully provided with ribs, it is decoupled from the subsequent half-tube 10 and, according to FIG. 8, connected together with a half-tube 10 which has already been provided with ribs to form an exchanger tube 28 by means of welding the longitudinal edges 27. This exchanger tube 28 can then be galvanized individually or in combination with other exchanger tubes 28.

Figure 4:
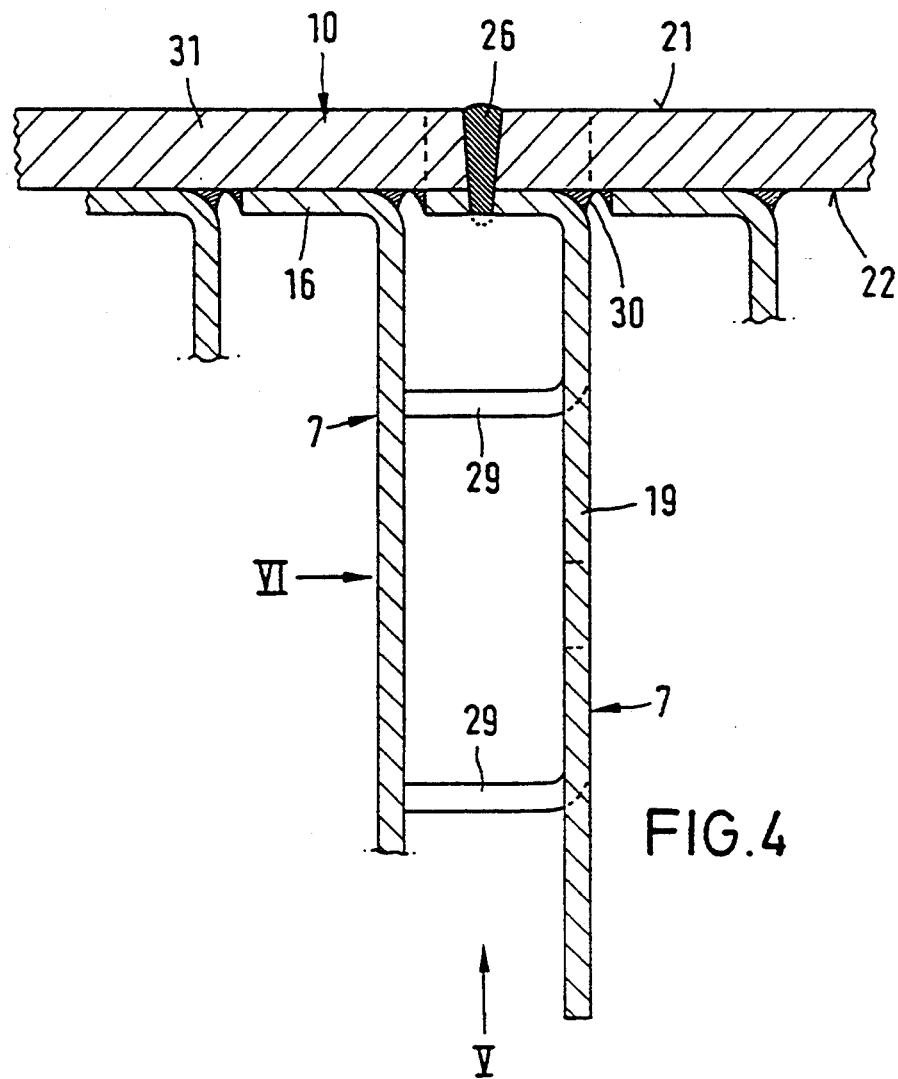
FIG. 4 is an enlarged view of a partial longitudinal section through a ribbed half-tube.
Figure 5:
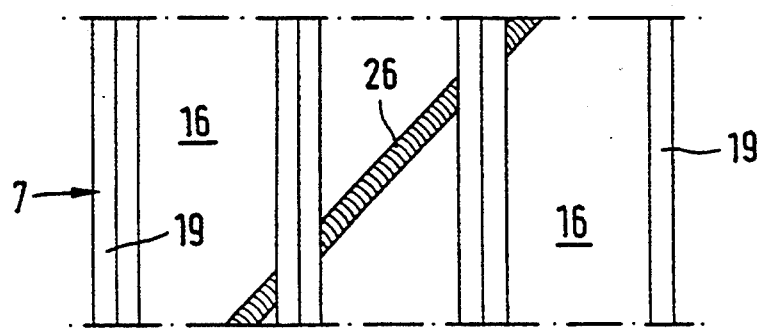
FIG. 5 is a top view of the view of FIG. 4 according to arrow V.
Figure 6:
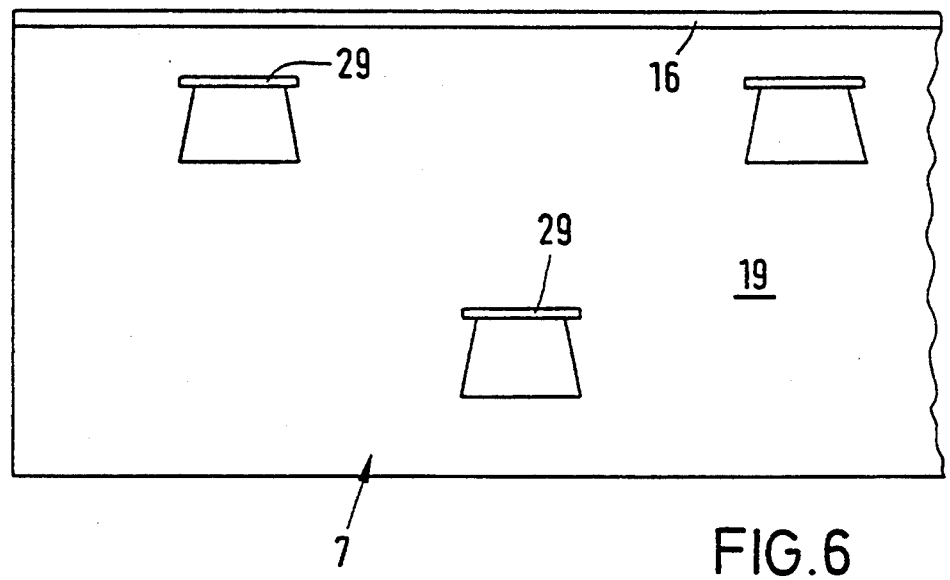
FIG. 6 shows a view of a portion of a rib according to arrow VI of FIG. 4.

It can be seen from FIGS. 4 and 6 that spacers 29 are punched out of the rib webs 19 and bent parallel to the rib feet 16. The length of the spacers 29 is made greater than the length of the rib feet 16. In this way, channel-like regions 30 can be formed during galvanization to improve the heat transfer from the tube wall 31 to the rib feet 16 (FIG. 4). The spacers 29 have a trapezoidal shape.

Figure 10:
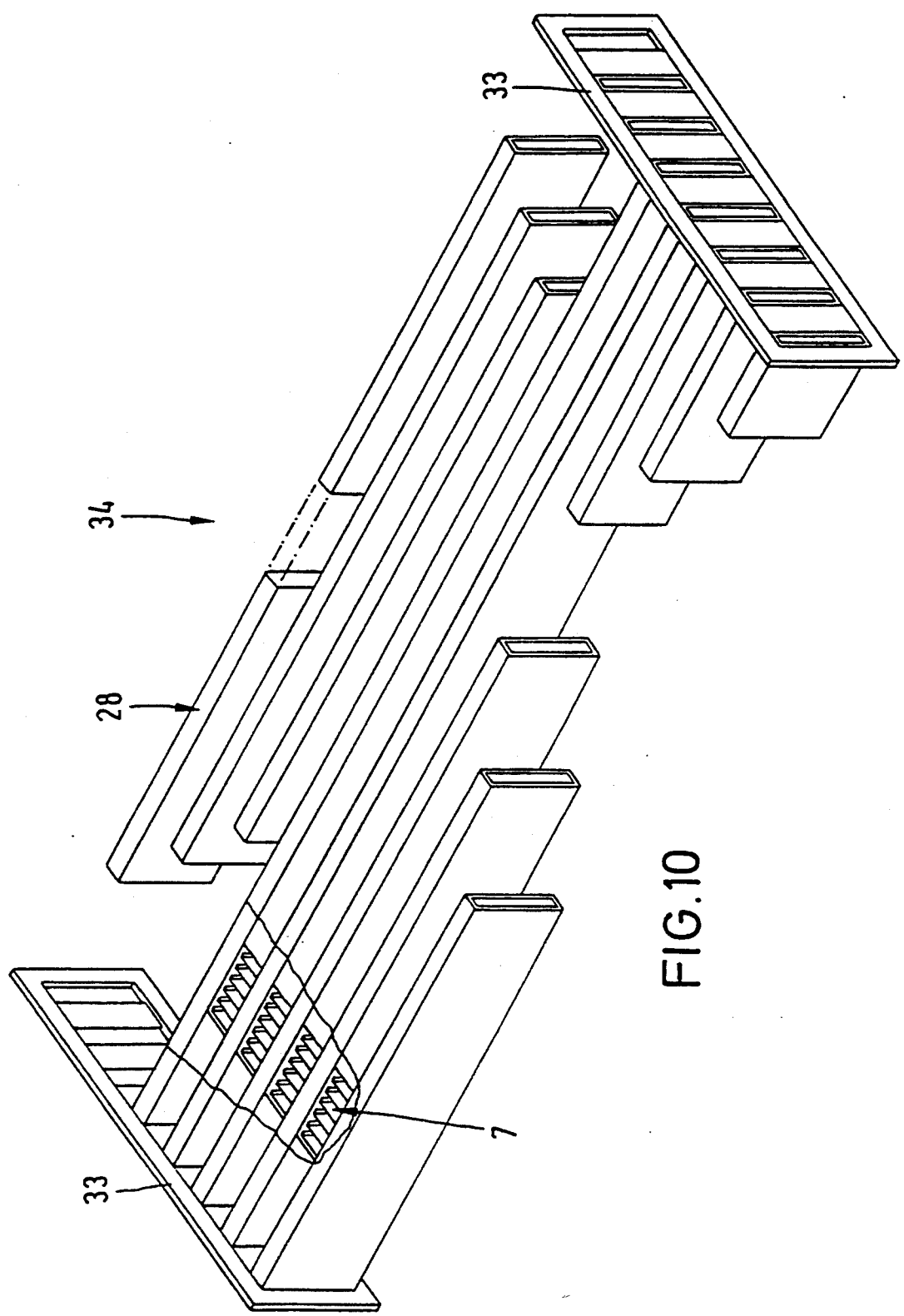
FIG. 10 is a perspective view of a heat exchanger.

As shown in FIG. 1, the isolating pinions 14 are connected with a carrier belt 6 via a coupling 32. The feed 8 can be decoupled from the carrier belt 6 by means of this coupling 32. The purpose of this step is to prevent the supplying of ribs 7 for the duration of the decoupling. This applies particularly for the end portions of the exchanger tubes 28 to be connected with the tube bases 33 of a heat exchanger 34 (FIG. 10).

Figure 7:
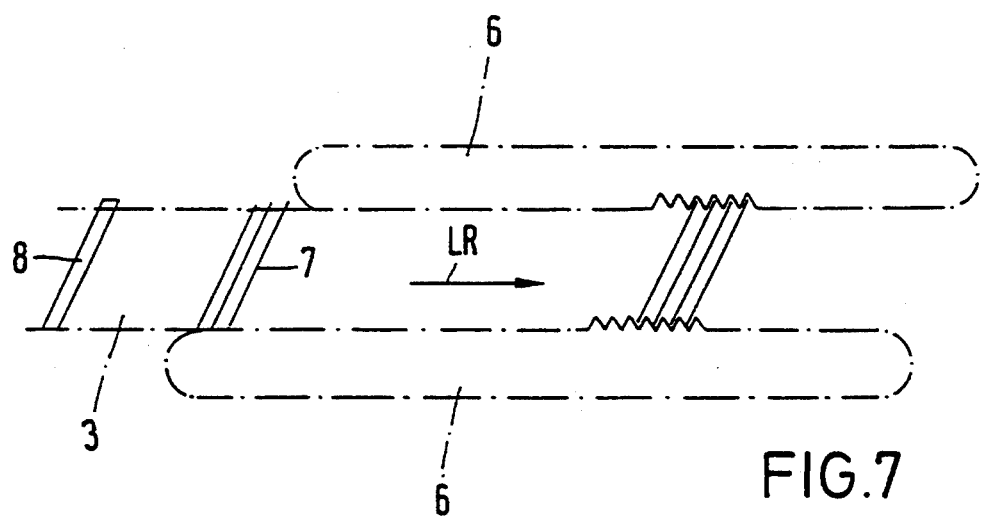
FIG. 7 is a schematic view of a variant of the view of FIG. 1.

A variant of the relative assignment of the carrier belts 6 to the supporting belt 3 is illustrated in FIG. 7. With this type of construction, the ribs 7 are to be fastened at the half-tubes 10 so as to be inclined toward the running direction LR of the supporting belt 3. To this end, the feed 8 is arranged diagonally at the required angle relative to the running direction LR of the supporting belt 3. Moreover, the carrier belts 6 are provided so as to be offset relative to one another in the longitudinal direction corresponding to this angle.

Figure 11:
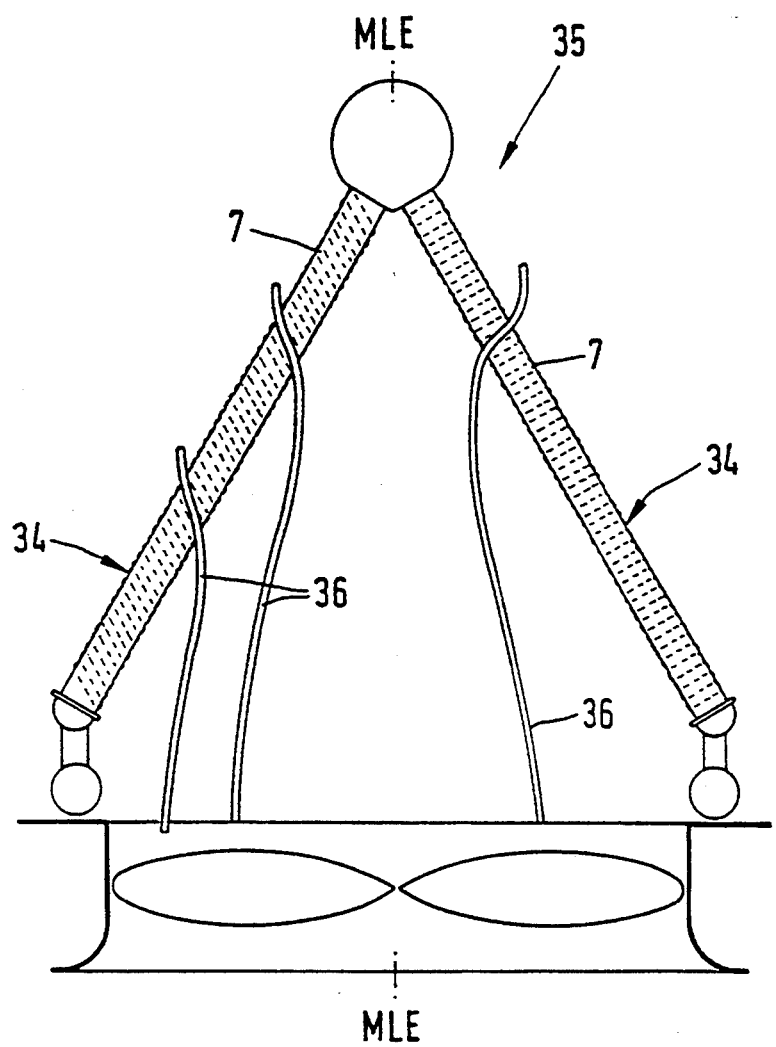
FIG. 11 is a front view of an air-cooled surface condenser in two different embodiment forms.

With reference to the view of FIGS. 1 and 7, an air-cooled surface condenser 35 is illustrated in FIG. 11 which has heat exchangers 34 arranged in a roof-shaped manner relative to one another. An embodiment form in which the ribs 7 are arranged exactly at a right angle relative to the longitudinal direction of the exchanger tubes is shown to the right of the vertical center longitudinal plane MLE. A heat exchanger 34 in which the ribs are arranged at an angle relative to the longitudinal direction of the exchanger tubes which diverges from 90° is shown to the left of the vertical center longitudinal plane MLE. The secondary losses on the coolant side can accordingly be perceptibly minimized. This is also made clear visually by the flow filaments 26 of the cooling air.

The embodiment form seen in FIG. 9 shows two half-tubes 10 which are connected with one another by U-shaped ribs 7' to form a composite element 37. The production of this composite element 37 is carried out primarily exactly like that of the half-tubes 10 with L-shaped ribs 7 which are then welded together according to FIG. 8 to form exchanger tubes 28. If the ribs 7' are applied to a half-tube 10, the half-tube 10 which is provided with ribs in this manner is rotated by 180° and the free rib feet 16' are brought into contact with the outer side 22 of another half-tube 10 with the use of the apparatus 1 according to FIG. 1. The ribbed half-tube 10 and the other half-tube 10 are then longitudinally displaced at the same speed and the free rib feet 16' are connected with the outer side 22 of this half-tube 10 by the laser beam 23 proceeding from the inner side 21 of the other half-tube 10.

After such a composite element 37 is completed, any desired number of such composite elements 37 can then be assembled to form a row of exchanger tubes by welding the half-tubes 10 along their longitudinal edges 27.

FIG. 10 shows a perspective view of a heat exchanger 34 comprising a plurality of exchanger tubes 28 which are arranged so as to be adjacent to one another and fixed at their ends in tube bases 33. Such a heat exchanger 34 can have exchanger tubes 28 according to FIG. 8 or exchanger tubes 28 comprising composite elements 37 according to FIG. 9. That is, such a heat exchanger 34 can also be completely galvanized.

We claim:

1. A process for the production of a heat exchanger including heat exchanger tubes, the exchanger tubes having a height and an extension in a flow direction of an outer exchange medium which is substantially greater than the height thereof, the process comprising the steps of manufacturing ribs which are L-shaped in cross-section, the ribs having rib feet and rib webs, placing a plurality of ribs with the rib feet thereof onto an outer surface of a half-tube in a quantity and with defined parallel spacing between the rib webs corresponding to the exchanger tube, displacing the ribs and the half-tube together at identical speeds in longitudinal direction of the half-tube, directing a fusion welding beam against an inner surface of the half-tube, guiding the fusion welding beam in a direction extending inclined relative to the longitudinal direction of the half-tube in a reciprocating manner over the entire width of the half-tube for connecting the rib feet to the outer surface of the half-tube, subsequently welding two ribbed half-tubes together at longitudinal edges thereof to form a heat exchanger tube, and finally subjecting the exchanger tube to a galvanizing process.

2. The process according to claim 1, wherein the fusion welding beam is a laser beam.

3. The process according to claim 1, wherein the fusion welding beam is an electron beam.

4. A process for the production of a heat exchanger including heat exchanger tubes, the exchanger tubes having a height and an extension in a flow direction of an outer exchange medium which is substantially greater than the height thereof, the process comprising the steps of manufacturing ribs which are U-shaped in cross-section, the ribs having rib feet and rib webs, placing a plurality of ribs with the rib feet thereof onto an outer surface of a half-tube in a quantity and with defined parallel spacing between the rib webs corresponding to the exchanger tube, displacing the ribs and the half-tube together at identical speeds in longitudinal direction of the half-tube, directing a fusion welding beam against an inner surface of the half-tube, guiding the fusion welding beam in a direction extending inclined relative to the longitudinal direction of the half-tube in a reciprocating manner over the entire width of the half-tube for connecting the rib feet to the outer surface of the half-tube, subsequently rotating the ribbed half-tube by 180°, the ribs further having free rib feet, placing together the outer surface of another half-tube and the free rib feet of the ribbed half-tube, displacing the ribbed half-tube and the other half-tube together at identical speeds in longitudinal direction, directing another fusion welding beam against an inner surface of the other half-tube, guiding the fusion welding beam directed against the inner surface of the other half-tube in a direction extending inclined relative to the longitudinal direction of the half-tubes in a reciprocating manner over the entire width of the other half-tube for connecting the free rib feet to the outer surface of the other half-tube, subsequently welding the half-tube and the other half-tube connected by the ribs to additional half-tubes and other half-tubes connected by ribs along longitudinal edges thereof to form exchanger tubes, and finally subjecting the exchanger tubes to a galvanizing process.

5. The process according to claim 4, wherein the fusion welding beam is a laser beam.

6. The process according to claim 4, wherein the fusion welding beam is an electron beam.

7. The method according to claim 1, further comprising punching spacers out of the rib webs, the spacers being dimensioned so as to be longer than the rib feet, and bending the spacers so as to extend parallel to the rib feet.

8. The method according to claim 4, further comprising punching spacers out of the rib webs, the spacers being dimensioned so as to be longer than the rib feet, and bending the spacers so as to extend parallel to the rib feet.

9. The process according to claim 1, comprising welding the ribs to the half-tubes so as to extend at an angle diverging from 90° relative to the longitudinal direction.

10. The process according to claim 4, comprising welding the ribs to the half-tubes so as to extend at an angle diverging from 90° relative to the longitudinal direction.

* * * * *